(12) United States Patent
Horade

(10) Patent No.: US 11,805,217 B2
(45) Date of Patent: Oct. 31, 2023

(54) IMAGE RECORDING DEVICE, METHOD OF CONTROLLING IMAGE RECORDING DEVICE, AND NON-TRANSITORY COMPUTER-READABLE RECORDING MEDIUM THEREFOR

(71) Applicant: Brother Kogyo Kabushiki Kaisha, Nagoya (JP)

(72) Inventor: Kenta Horade, Tokai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/706,928

(22) Filed: Mar. 29, 2022

(65) Prior Publication Data
US 2022/0321732 A1 Oct. 6, 2022

(30) Foreign Application Priority Data
Mar. 30, 2021 (JP) .................. 2021-056689

(51) Int. Cl.
*H04N 1/387* (2006.01)
*B41J 29/393* (2006.01)
(Continued)

(52) U.S. Cl.
CPC ....... *H04N 1/3878* (2013.01); *H04N 1/00718* (2013.01); *B41J 11/0095* (2013.01); *B41J 29/393* (2013.01)

(58) Field of Classification Search
CPC .... B41J 11/0095; B41J 11/42; B41J 13/0045; B41J 29/38; B41J 29/393;
(Continued)

(56) References Cited

U.S. PATENT DOCUMENTS 8,308,261 B2 * 11/2012 Aruga ............... B41J 2/155
347/14
8,398,079 B2 * 3/2013 Ootsuka ............ B65H 9/002
271/239
(Continued)

FOREIGN PATENT DOCUMENTS

| JP | 2006-232469 A | 9/2006 |
|---|---|---|
| JP | 2009-190412 A | 8/2009 |

(Continued)

*Primary Examiner* — Negussie Worku
(74) *Attorney, Agent, or Firm* — Banner & Witcoff, Ltd.

(57) ABSTRACT

An image recording device comprises a conveyance mechanism, a head, a sensor configured to detect a position of an orthogonal edge of recording medium in a direction orthogonal to a conveyance direction, and a controller. The controller tentatively determines, for each of a plurality of unit areas aligned in the conveyance direction on the recording medium, a recording position of an image for the unit area based on image data and a size of the recording medium, derives a correction amount for the tentatively determined recording position, and determines whether the correction amount exceeds a first upper limit for each unit area. When it is determined that the correction amount does not exceed the first upper limit, the controller determines the recording position based on the correction amount, and causes the head to record an image at the recording position determined in the determining.

13 Claims, 14 Drawing Sheets

(51) Int. Cl.
*H04N 1/00* (2006.01)
*B41J 11/00* (2006.01)

(58) Field of Classification Search
CPC .......... B65H 2511/212; B65H 2513/41; B65H 2513/412; B65H 2557/262; B65H 2557/264; B65H 2557/63; B65H 2801/06; B65H 3/0669; B65H 5/06; B65H 5/062; B65H 7/06; H02P 7/06; H04N 1/00718; H04N 1/32448; H04N 1/3878; H04N 23/667; H04N 23/72
USPC ........................................................ 358/400
See application file for complete search history.

(56) References Cited

U.S. PATENT DOCUMENTS

| | | | | |
|---|---|---|---|---|
| 8,807,689 | B2* | 8/2014 | Hori | B41J 15/165 347/16 |
| 8,820,738 | B2* | 9/2014 | Deno | B65H 9/006 271/272 |
| 9,026,029 | B2* | 5/2015 | Furuyama | G03G 15/6561 399/388 |
| 9,760,815 | B2* | 9/2017 | Takada | H04N 1/58 |
| 2010/0283199 | A1 | 11/2010 | Yasumoto | |
| 2010/0295886 | A1* | 11/2010 | Aruga | B41J 11/008 347/14 |
| 2012/0025457 | A1* | 2/2012 | Inoue | B65H 9/002 271/227 |
| 2014/0193186 | A1* | 7/2014 | Furuyama | G03G 15/6567 399/388 |
| 2015/0174928 | A1* | 6/2015 | Tokisawa | B41J 13/0009 347/16 |
| 2015/0251467 | A1* | 9/2015 | Ito | B41J 11/005 347/37 |
| 2018/0356762 | A1* | 12/2018 | Okubo | G03G 15/6561 |
| 2021/0379910 | A1* | 12/2021 | Arakawa | B65H 5/06 |

FOREIGN PATENT DOCUMENTS

| | | |
|---|---|---|
| JP | 2010-260696 A | 11/2010 |
| JP | 2016-124116 A | 7/2016 |

\* cited by examiner

IMAGE RECORDING DEVICE, METHOD OF CONTROLLING IMAGE RECORDING DEVICE, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2021-056689 filed on Mar. 30, 2021. The entire subject matter of the application is incorporated herein by reference.

BACKGROUND

The present disclosures relate to an image recording device configured to record images on a recording medium, a method of controlling the image recording device, and a non-transitory computer-readable recording medium for such an image recording device.

There has been known a technique of correcting for sheet skew by making a side edge (i.e., an orthogonal direction edge) of a sheet (i.e., a recording medium) in contact with a reference member. By performing skew correction in this way, misalignment in the orthogonal direction of an image recorded on the sheet can be suppressed.

When skew correction is performed only at a leading end portion of the sheet, for example, an effect of skew becomes greater at a trailing end portion of the sheet, and it may become difficult to suppress orthogonal misalignment of the image. This problem is especially pronounced when the sheet is long, making it difficult to control orthogonal misalignment of the image.

SUMMARY

According to aspects of the present disclosure, an image recording device, comprises a conveyance mechanism configured to convey a recording medium in a conveyance direction, a head configured to record an image onto the recording medium, a sensor configured to detect a position of an orthogonal edge that is an edge of the recording medium in a direction orthogonal to the conveyance direction, and a controller. The controller can tentatively determine, for each of a plurality of unit areas aligned in the conveyance direction on the recording medium, a recording position of an image recorded by the head for the unit area based on image data and a size of the recording medium, derive a correction amount for the tentatively determined recording position in the orthogonal direction for each unit area based on the edge position detected by the sensor, and determines whether the correction amount exceeds a first upper limit for each unit area. When it is determined, in the determining, that the correction amount does not exceed the first upper limit, the controller can determine the recording position based on the correction amount as a recording position for the unit area, and causes the head to record an image, for each unit area, at the recording position determined in the determining.

DETAILED DESCRIPTION OF THE EMBODIMENTS

First Embodiment

Figure 1:
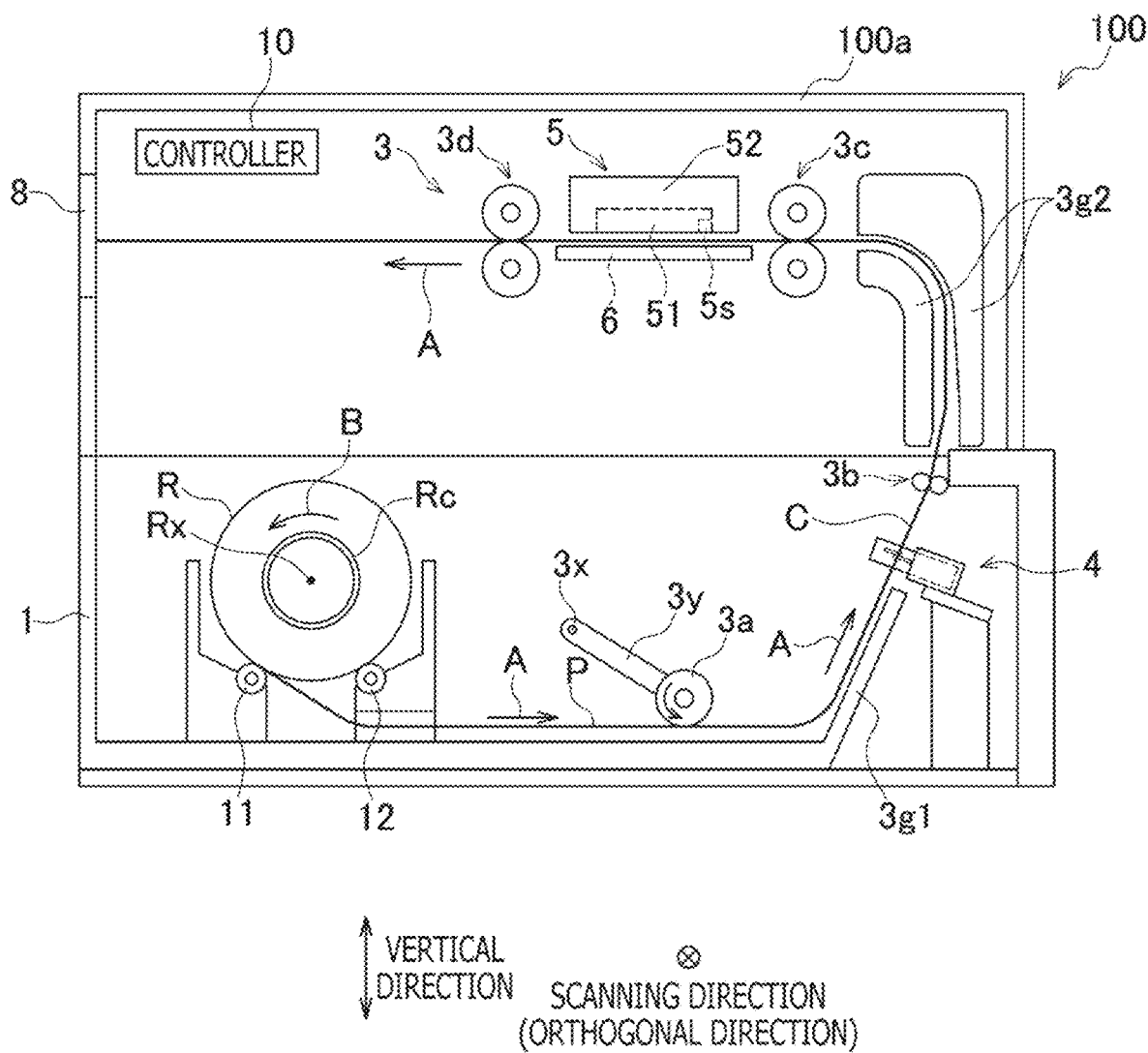
FIG. 1 is a side view of a printer according to a first embodiment of the present disclosures.

First, referring to FIG. 1, an overall configuration of a printer 100 (i.e., an image recording device) according to a first embodiment of the present disclosures will be described.

The printer 100 includes a housing 100a, a sheet feed tray 1, a conveyance mechanism 3, a cutter mechanism 4, a head unit 5, a platen 6, a sheet discharge tray 8, and a controller 10.

The sheet feed tray 1 corresponds to the "tray" according to the present disclosures, has a box shape that opens upward, and is detachably attached to a lower part of the housing 100a. The sheet discharge tray 8 is constituted by an upper wall of the housing 100a, and can be opened and closed with respect to the housing 100a.

The sheet feed tray 1 is configured to accommodate a sheet roll R (roll body). The sheet roll R has a sheet P (i.e., a recording medium) that is wound around an outer circumference of a cylindrical core member Re in the form of a roll. The sheet roll R is housed in the sheet feed tray 1 with its rotation axis Rx (a central axis of the core member Re) along a scanning direction, and is supported by two rollers 11, 12.

The conveyance mechanism 3 includes a feed roller 3a, an intermediate roller pair 3b, a conveyance roller pair 3c, a sheet discharge roller pair 3d, and guides 3g1 and 3g2.

The feed roller 3a is axially supported by a tip end of the arm 3y. The arm 3y is freely supported by the support shaft 3x, and the feed roller 3a is attached to the bottom of the sheet feed tray 1. The feed roller 3a is a driving roller that is rotated by a driving force of a conveyance motor 3m (see FIG. 3). The intermediate roller pair 3b, the conveyance roller pair 3c, and the sheet discharge roller pair 3d each includes a driving roller that is rotated by the drive of the conveyance motor 3m and a driven roller that accompanies the driving roller.

When the conveyance motor 3m (see FIG. 3) is driven by the controller 10 and the feed roller 3a rotates, the sheet roll R rotates in an arrow direction B as shown in FIG. 1, and the sheet P unwound from the sheet roll R is fed toward the intermediate roller pair 3b. Then, the intermediate roller pair 3b, the conveyance roller pair 3c, and the sheet discharge roller pair 3d rotate while holding the sheet P, and the sheet P is transported along the conveyance path C in a conveyance direction A.

The guide 3g1 is disposed between the feed roller 3a and the intermediate roller pair 3b in the conveyance path C. and guides the sheet P fed by the feed roller 3a to the intermediate roller pair 3b. The guide 3g1 is constituted by the side walls of the sheet feed tray 1.

The guide 3g2 is disposed between the intermediate roller pair 3b and the conveyance roller pair 3c in the conveyance path C. and guides the sheet P transported by the intermediate roller pair 3b to the conveyance roller pair 3e. The guide 3g2 is constituted by a pair of plate-like members arranged so as to sandwich the conveyance path C.

The cutter mechanism 4 includes a pair of rotating blades arranged across the conveyance path C. When the cutter motor 4m (see FIG. 3) is driven under the control of the controller 10, the pair of rotating blades rotate and the sheet P unwound from the sheet roll R is cut.

The head unit 5 is located between the conveyance roller pair 3c and the sheet discharge roller pair 3d in the conveyance path C, and includes a head 51 and a carriage 52 that holds the head 51.

The platen 6 is located between the conveyance roller pair 3c and the sheet discharge roller pair 3d in the conveyance path C, and below the head unit 5.

Figure 2:
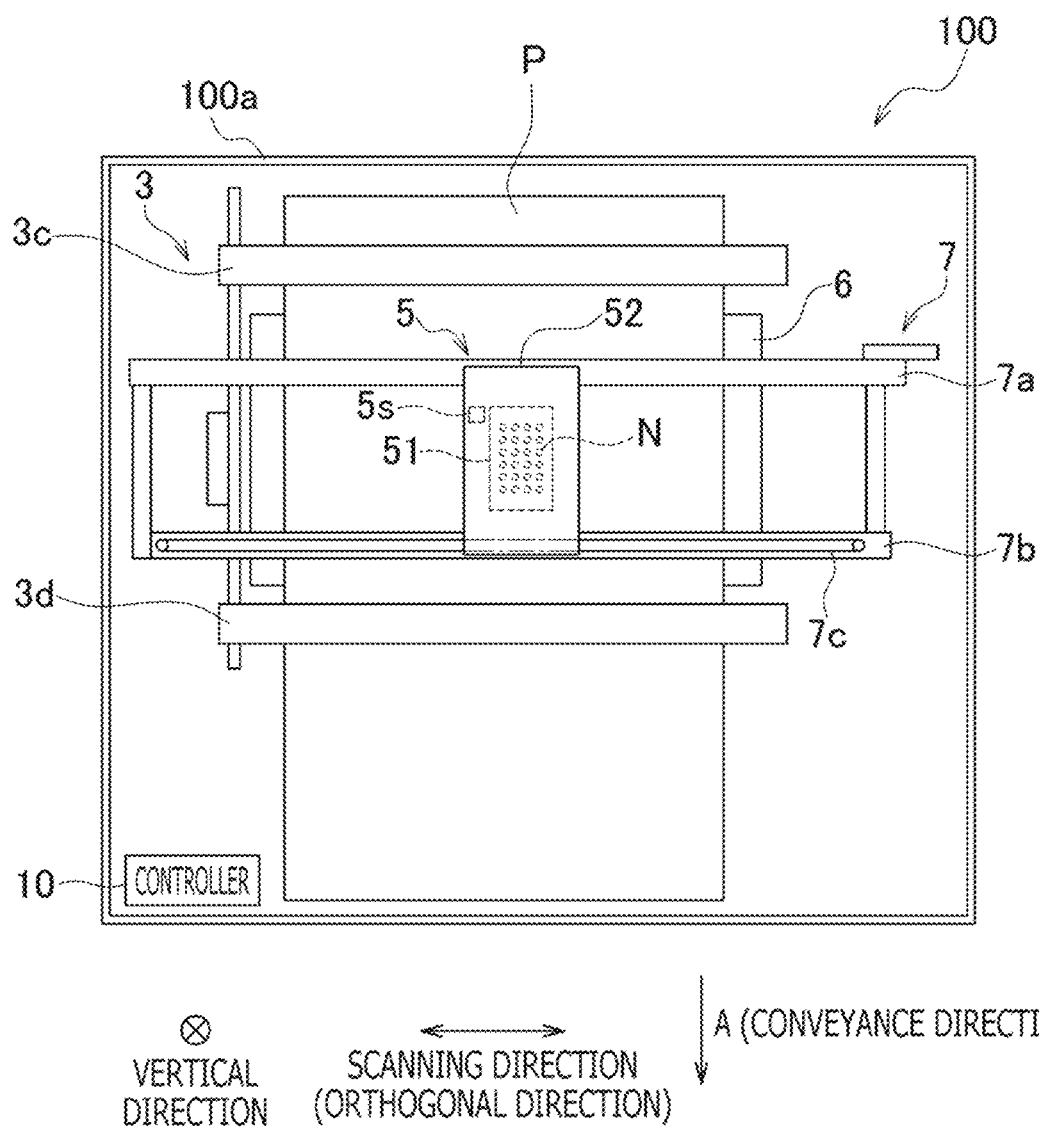
FIG. 2 is a plan view of the printer shown in FIG. 1.

The head 51 and the carriage 52 can be moved in the scanning direction (i.e., an "orthogonal direction" orthogonal to the conveyance direction A) by the moving mechanism 7 (see FIG. 2). The moving mechanism 7 includes a pair of guides 7a and 7b supporting the carriage 52, and a belt 7c connected to the carriage 52. When the carriage motor 7m (see FIG. 3) is driven under the control of the controller 10, the belt 7c runs, and the carriage 52 moves along the guides 7a and 7b in the scanning direction.

Multiple nozzles N are formed on a lower surface of the head 51. When the sheet P conveyed by the conveyance mechanism 3 passes below the head 51 while being supported by the platen 6, the driver IC 5m (see FIG. 3) is driven under the control of the controller 10, ink is ejected from the nozzles N and an image is recorded on the sheet P.

Figure 3:
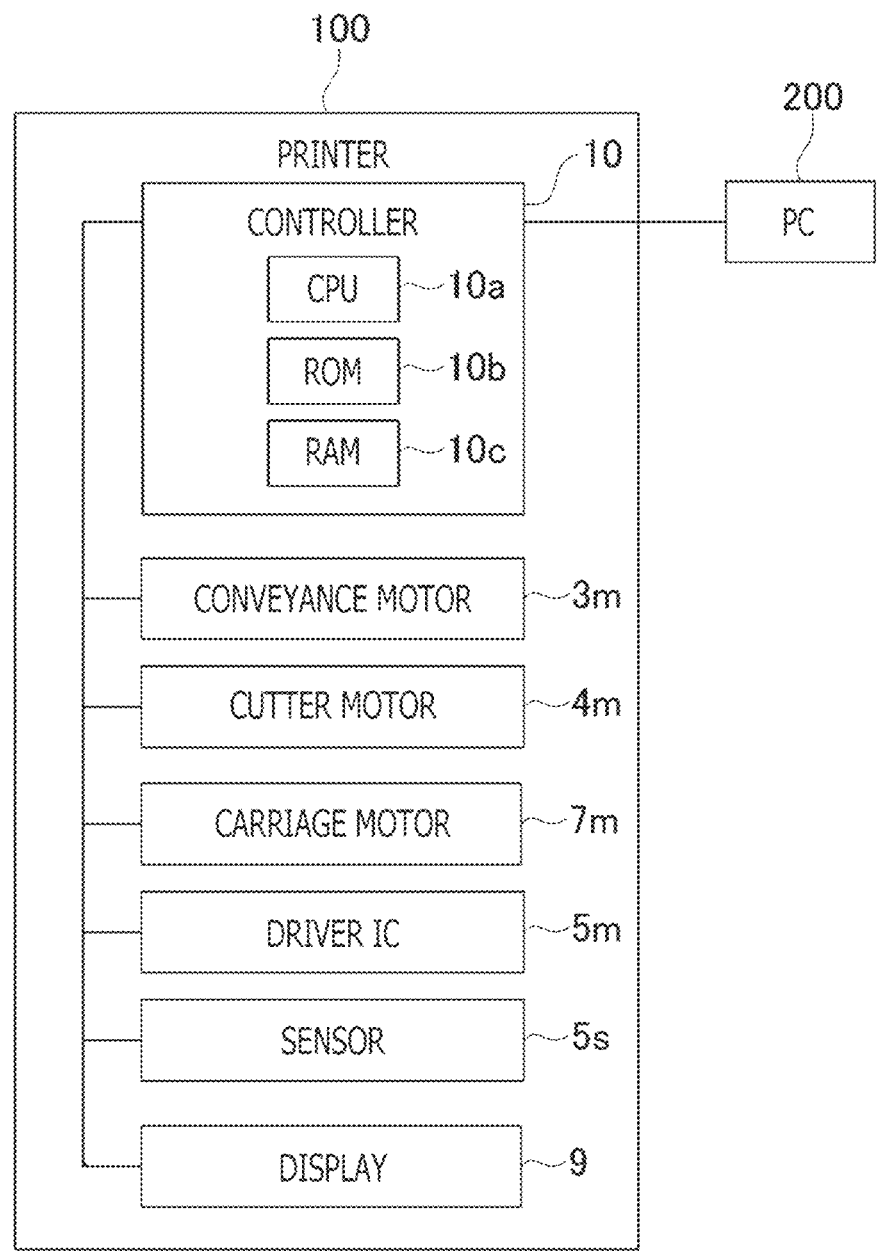
FIG. 3 is a bock diagram of an electrical configuration of the printer shown in FIG. 1.

As shown in FIG. 3, the controller 10 has a CPU (Central Processing Unit) 10a, a ROM (Read Only Memory) 10b, and a RAM (Random Access Memory) 10c. The ROM 10b stores programs and data for the CPU 10a to control various operations. The RAM 10c temporarily stores data used by CPU 10a in executing the program. The CPU 10a performs recording and other operations in accordance with the program and based on data stored in the ROM 10b and the RAM 10c, and based on data received from an external device (such as PC 20 shown in FIG. 3). The CPU 10a corresponds to a "controller" according to aspects of the present disclosures.

In the recording process, the CPU 10a drives the conveyance motor 3m, the cutter motor 4m, the carriage motor 7m, and the driver IC 5m in accordance with recording commands (including image data) received from the PC 20, and the like, to cut the sheet P unwound from the sheet roll R to a particular length. The CPU 10a further executes a conveying operation to convey the sheet P by a particular amount in a conveyance direction A and a scanning operation to cause the ink to be ejected from the nozzles N to the sheet P while moving the head 51 in the scanning direction, alternately. As a result, ink dots are formed on the sheet P, thereby an image being recorded. The sheet P on which the image has been recorded is received by the sheet discharge tray 8, which is open to the housing 100a.

The controller 10 is electrically connected to a display 9 (i.e., an informing unit) of the printer 100, and notifies information to the user of the printer 100 through the display 9.

A sensor 5s is attached to the carriage 52 to detect a position of a side edge (i.e., a position of an end of the scanning direction) of the sheet P, as shown in FIGS. 1 and 2. The sensor 5s is arranged on one side, in the scanning direction, with respect to the head 51, as shown in FIG. 2. The sensor 5s is arranged upstream of the conveyance direction A with respect to the plurality of nozzles N. The sensor 5s is a light-reflective sensor having a light-emitting part and a light-receiving part, wherein the light-emitting part irradiates light downward and the light-receiving part receives the light reflected from either the platen 6 or the sheet P. The data indicating the amount of reflected light received by the light-receiving part is transmitted to the controller 10. In the controller 10, the CPU 10a can detect a position of the side edge of a portion of the sheet P facing the sensor 5s by comparing the data received from the sensor 5s while the carriage 52 moves in the scanning direction with the data indicating the amount of light reflected from the platen 6 and the amount of light reflected from the sheet P stored in the ROM 10b.

Next, the program executed by the CPU 10a will be described.

Figure 4A:
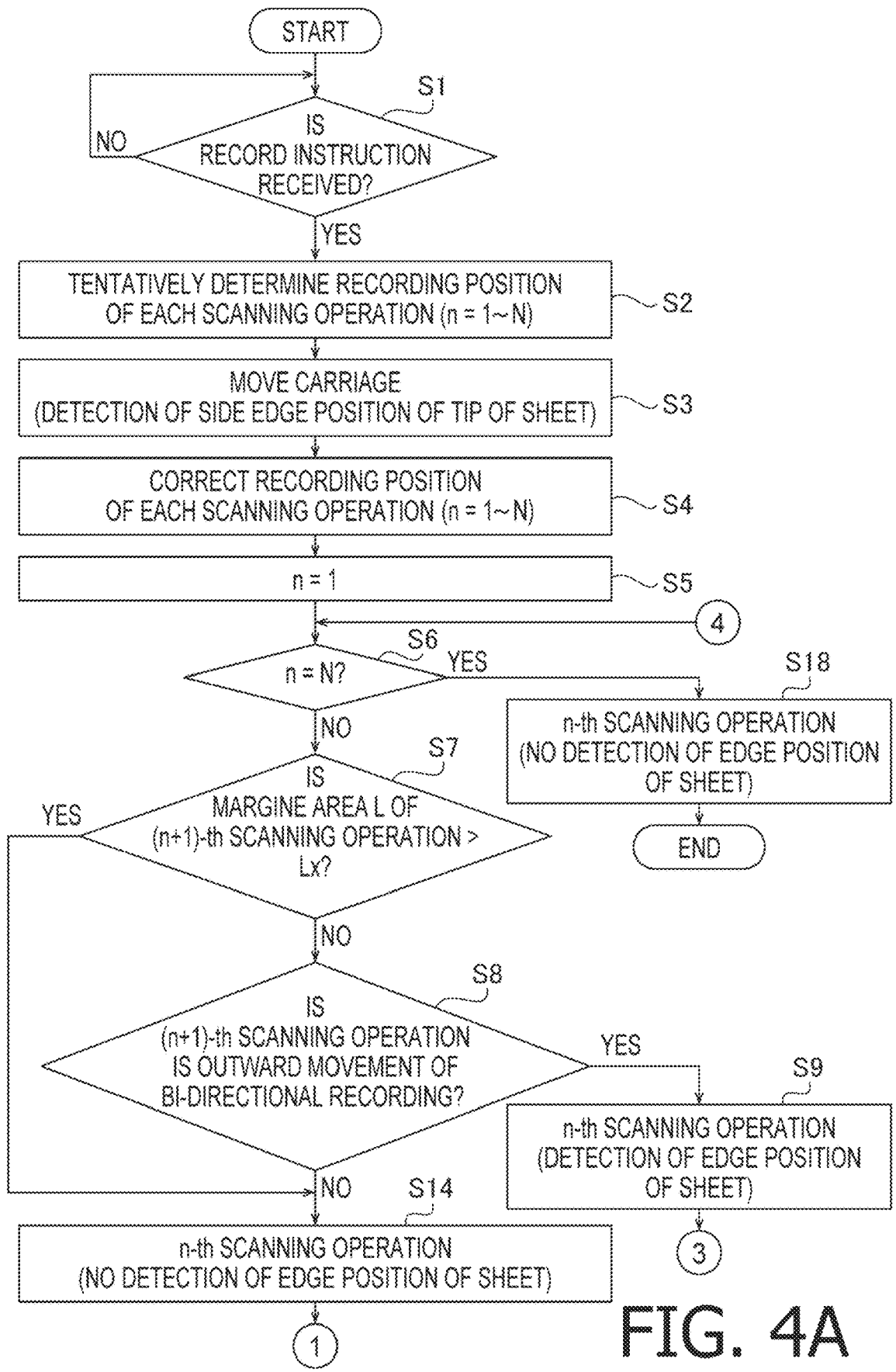
FIGS. 4A and 4B show a flowchart illustrating a program to be executed by a CPU of the printer in FIG. 1.
Figure 4B:
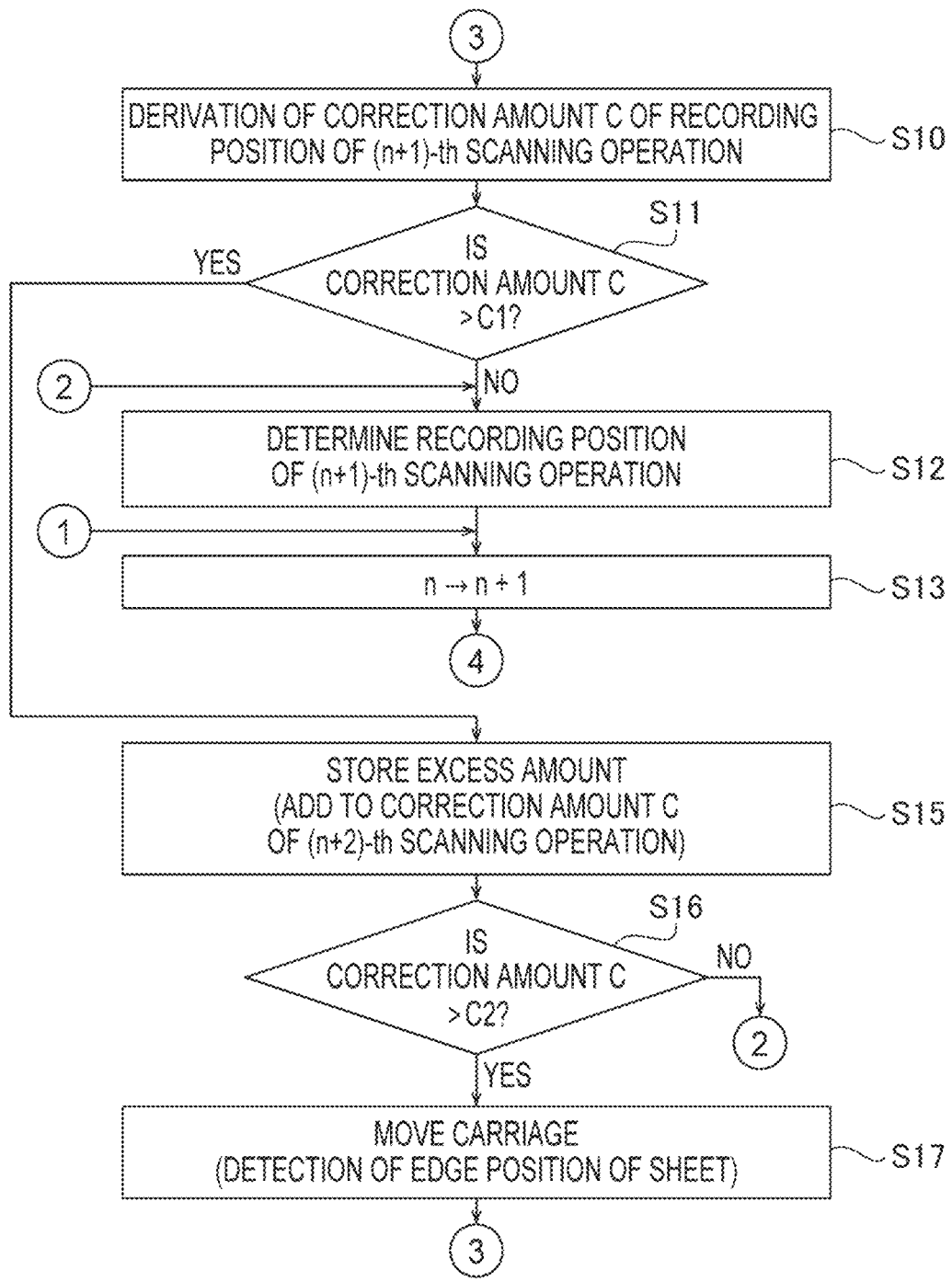

The CPU 10a first determines whether or not a recording command has been received from the PC 20 or the like (S1), as shown in FIGS. 4A and 4B. When it is determined that the recording command has not been received (S1: NO), the CPU 10a repeats the process of S1.

Figure 5:
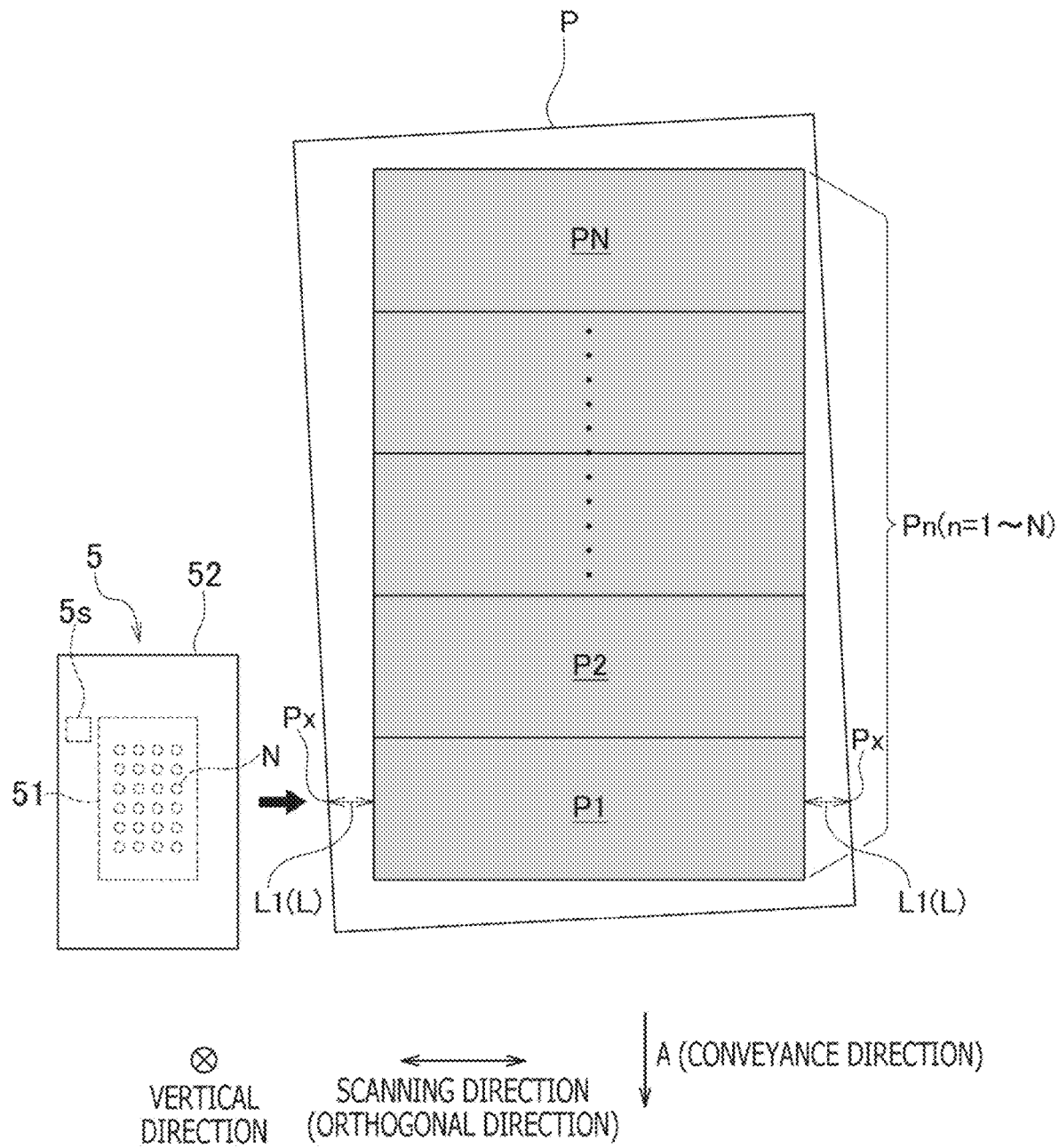
FIG. 5 schematically shows a diagram illustrating a state in which a recording position of each scanning operation is corrected based on a side edge position of a tip portion of a sheet.

When it is determined that a recording command has been received (S1: YES), the CPU 10a tentatively determines the recording position for each scanning operation based on the image data of the recording command and the size of the sheet P (S2: tentative determination process). As shown in FIG. 5, an n-th scanning operation (n=1 to N) is sequentially executed for each of the scanning areas Pn (n=1 to N) of the sheet P. Each of the scanning areas Pn (n=1 to N) is a strip-like area extending in the orthogonal direction and aligned in the conveyance direction A. In this embodiment, one scanning area Pn corresponds to a "unit area" according to the present disclosures. The recording position includes a recording start position and a recording end position for each scanning area Pn, and the recording position is defined by a movement speed of the carriage 52 and a driving timing of the driver IC 5m. In S2, the recording position is determined on assumption that the sheet P is at a particular position in the orthogonal direction and that the side edge Px of the sheet P is parallel to the conveyance direction A.

After S2, the CPU 10a causes the conveyance mechanism 3 to convey the sheet P to a position where a leading edge of the sheet P (i.e., a downstream end of the sheet P in the conveyance direction A) faces the sensor 5s. Then, the CPU 10a moves the carriage 52 in the scanning direction with the sheet P being stayed at that position, and detects a position of the side edge Px of a leading edge of the sheet P based on the data received from the sensor 5s while the carriage 52 is moving (S3).

After execution of S3, the CPU 10a corrects the recording position of which for the scanning operation is the position tentatively determined in S2 in the orthogonal direction based on a position of the side edge Px detected in S2. Concretely, the CPU 10a corrects the recording position such that the center of each scanning area Pn in the orthogonal direction and the center the tip of sheet P in the orthogonal direction of are corrected to match. As a result, the center of the tip of sheet P is corrected to be the same as the center of the tip of sheet P such that the length L1 (see FIG. 5) in the orthogonal direction of margin areas on both sides of the orthogonal direction for scanning area P1 will be the same as each other even when they are shifted from the particular position in the orthogonal direction. However, with correction of S4 alone, if the sheet P is skewed (i.e., the side edge Px of the sheet P is not parallel to the conveyance direction A but is inclined to the conveyance direction A) as shown in FIG. 5, the difference in the orthogonal length of the margin areas on both sides of the orthogonal direction to the scanning area Pn becomes larger on the rear side of the sheet P (upstream of the conveyance direction A). The difference in the orthogonal length of the margin areas on both sides of the orthogonal direction to the scanning area Pn becomes larger on the rear edge of the sheet P (upstream of the conveyance direction A), and orthogonal misalignment of the image may become a problem. Therefore, in this embodiment, S10 and other steps described below are performed.

After execution of S4, the CPU 10a sets n to one (i.e., n=1) (S5).

After execution of S5, the CPU 10a determines whether or not n is equal to N (i.e., n=N) (i.e., whether or not the scanning operation is the final scanning operation) (S6).

When n is not equal to N (S6: NO), the CPU 10a determines whether the length L, in the orthogonal direction, of the margin area in the n+1 scanning operation exceeds the particular length Lx, based on the image data (S7: fifth determination process).

When the length L, in the orthogonal direction, of the margin area does not exceed the particular length Lx (S7: NO), the CPU 10a determines whether or not the (n+1)-th scanning operation corresponds to an outward movement of a "bi-directional recording" (S8). There are two types of recording. One is the "bi-directional recording" in which a scanning operation (i.e., an operation to eject ink from the nozzles N while moving the head 51) is performed when the head unit 5 is moved in an outward (i.e., going-way) direction (along the thick arrow in FIG. 5) and when it is moved in the inward (i.e., returning-way) direction (in the opposite direction of the thick arrow in FIG. 5). There other is a "one-directional recording" in which the scanning operation is performed when the head unit 5 is moved in the outward direction, but not performed when the head unit 5 is moved in the inward direction (i.e., the head 51 is moved but the ink is not ejected from the nozzles N). The choice between "bi-directional recording" and "one-directional recording" is determined in advance based on the image resolution and recording speed. In this embodiment, the "bi-directional recording" is assumed to be performed.

When the (n+1)-th scanning operation corresponds to the outward movement of the "bi-directional recording" (S8: YES), the CPU 10a executes the n-th scanning operation for the scanning area Pn and detects the position of the side edge Px of the sheet P based on the data received from the sensor 5s while the carriage 52 moves in the scanning direction in the n-th scanning operation (S9).

Figure 6:
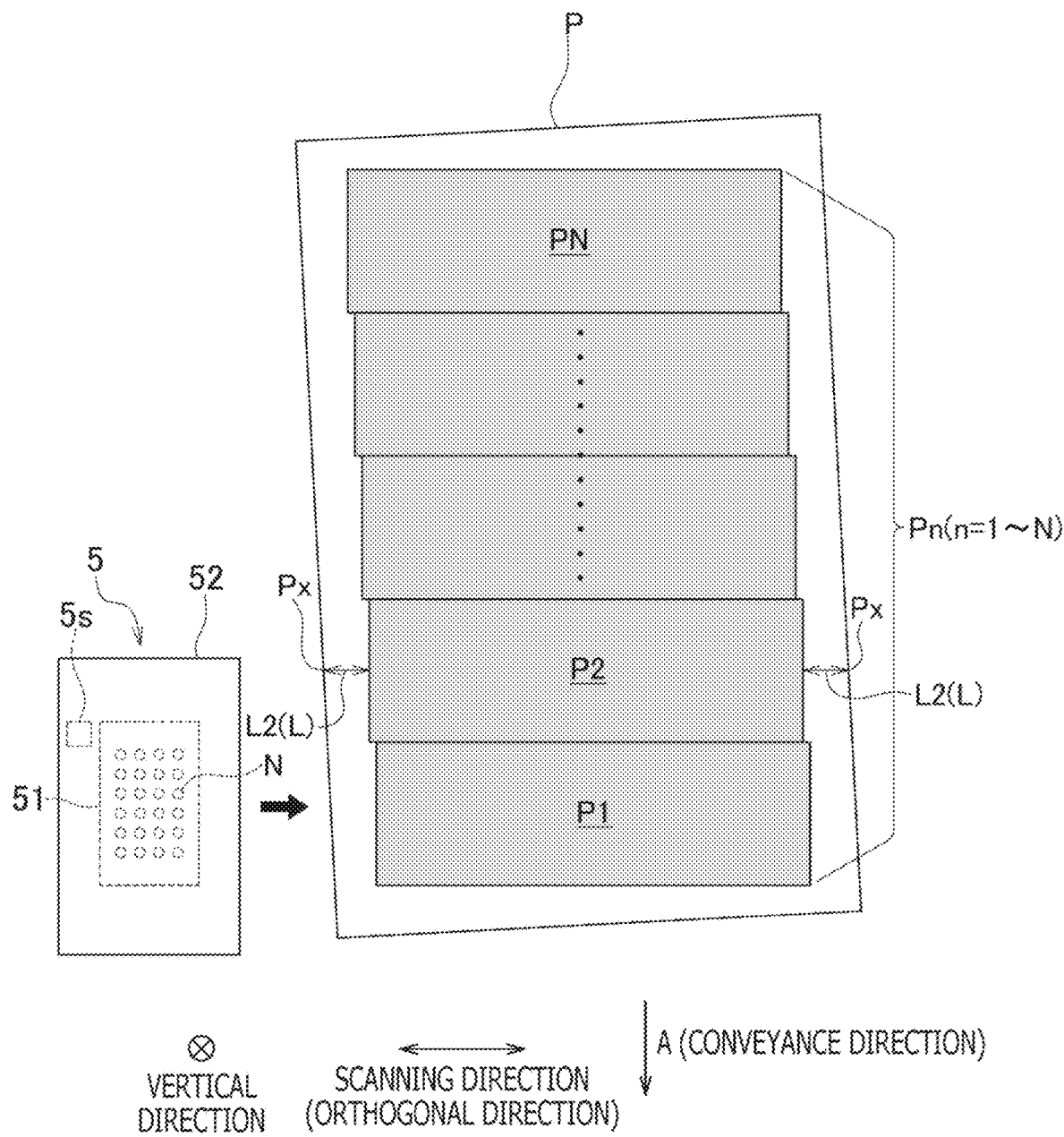
FIG. 6 schematically shows a diagram illustrating a state in which the recording position of each scanning operation is corrected based on the side edge portion of the tip portion of the sheet.

After execution of S9, the CPU 10a derives a correction amount C, in the orthogonal direction, of the recording position corrected in S4 for the (n+1)-th scanning operation based on the position of the side edge Px of the sheet P detected in S9 (S10: a correction amount derivation process). Concretely, the correction amount C is derived so that the center, in the orthogonal direction, of the scanning area Pn+1 matches the center, in the orthogonal direction, of the sheet P (i.e., a part corresponding to the scanning area Pn where the side edge Px was detected in S9). As a result, the lengths L2 (see FIG. 6), in the orthogonal direction, of the margin areas on both sides with respect to the scanning area Pn+1 become the same. In other words, by executing S10, the orthogonal misalignment of the image can be suppressed even when the sheet P is skewed (i.e., the side edge Px of the sheet P is not parallel to the conveyance direction A, but is inclined to the conveyance direction A) as shown in FIG. 6.

After execution of S10, the CPU 10a determines whether or not the correction amount C derived in S10 exceeds a first upper limit amount C1 (S11: a first determination process).

When the correction amount C does not exceed the first upper limit amount C1 (S11: NO), the CPU 10a determines the recording position based on the correction amount C as the recording position for the (n+1)-th scanning operation (i.e., a scanning operation for the scanning area Pn+1) (S12: a decision process).

After execution of S12, the CPU 10a sets n to "n+1" (S13) and returns the process to S6.

When the length L, in the orthogonal direction, of the margin area exceeds the particular length Lx (S7: YES) or when the (n+1)-th scanning operation does not correspond to the outward movement of the "bi-directional recording" (i.e., when the (n+1)-th scanning operation corresponds to the backward movement) (S8: NO), the CPU 10a executes the n-th scanning operation for the scanning area Pn without executing S9 or S10 (S14).

When the correction amount C exceeds the first upper limit amount C1 (S11: YES), the CPU 10a stores an excess amount of the correction amount C that exceeds the first upper limit amount C1 in the RAM 10c (S15). The excess amount is added to the correction amount for an (n+2)-th scanning operation (i.e., a scanning operation for the scanning area Pn+2 that is adjacent to the scanning area Pn+1 on an upstream side in the conveyance direction A).

After execution of S15, the CPU 10a determines whether or not the correction amount C exceeds a second upper limit amount C2 (which is greater than the first upper limit amount C1) (S16: a second determination process).

When the correction amount C does not exceed the second upper limit amount C2 (S16: NO), the CPU 10a moves the process to S12 and determines the recording position based on the correction amount C as the recording position for the (nit 1)-th scanning operation (i.e., the scanning operation for the scanning area Pn+1) (S12: a decision process).

When the correction amount C exceeds the second upper limit amount C2 (S16: YES), the CPU 10a moves the carriage 52 in the scanning direction to detect the position of the side edge Px of the sheet P again (S17), and then moves the process to S10 to derive the correction amount C again based on the position of the side edge Px of the sheet P detected in S17 (S10: a correction amount derivation process).

When n=N (S6: YES), the CPU. 10a executes the n-th scanning operation for the scanning area Pn (S18) and terminates the program.

In S9, S14, and S18, which are executed after S6, the scanning operation is executed at the recording position determined in the most recent execution of S12 (i.e., a recording process).

As described above, according to the present embodiment, after tentatively determining the recording position for each scanning operation (S2), the CPU 10a derives the correction amount C, in the orthogonal direction, of the recording position tentatively determined in S2 for each scanning area Pn based on the side edge position of the sheet P detected by the sensor 5s (S10). According to the thus derived correction amount C, the misalignment, in the orthogonal direction, of the image recorded on the sheet P can be suppressed even if the sheet P is skewed. In the case of a large correction amount C that exceeds the first upper limit amount C1, the orthogonal misalignment between the image recorded in the scanning area Pn and the image recorded in the scanning area Pn+1 (the scanning area adjacent to the scanning area Pn in the conveyance direction A) could be large. In this regard, according to the present embodiment, such a problem can be suppressed by performing recording based on the correction amount C when the correction amount C does not exceed the first upper limit amount C1 (S11: NO).

When the correction amount C exceeds the first upper limit amount C1 (S11: YES), the CPU 10a adds the excess amount of the correction amount C that exceeds the first upper limit amount C1 to the correction amount of the n+2 scanning operation (i.e., a scanning operation for the scanning area Pn+2 that is adjacent to the scanning area Pn+1 on the upstream side in the conveyance direction A) (S15). In this way, the orthogonal misalignment of the image between adjacent scanning areas Pn and the misalignment of the image due to skewing of sheet P can be suppressed in a well-balanced manner.

When the correction amount C exceeds the first upper limit amount C1 (S11: YES), the CPU 10a determines whether the correction amount C exceeds the second upper limit amount C2 (which is greater than the first upper limit amount C1) (S16). When the correction amount C exceeds the second upper limit amount C2 (S16: YES), the CPU 10a obtains the detection result of the position of the side edge Px of the sheet P from the sensor 5s again (S17), and derives the correction amount C again based on the detection result obtained again (S10). In the case of a large correction amount C that exceeds the second upper limit amount C2, there is a possibility of false detection by the sensor 5s. Therefore, in this embodiment, in such a case, the detection result is obtained from the sensor 5s again and the correction amount is derived, thereby avoiding extreme correction based on false detection.

When the length L, in the orthogonal direction, of the margin area in the (n+1)-th scanning operation does not exceed the particular length Lx (S7: NO), the CPU 10a executes the correction amount derivation process (S10), while when the length L, in the orthogonal direction, of the margin area in the (n+1)-th scanning operation exceeds the particular length Lx (S7: YES), the correction amount derivation process (S10) is not executed. When the length L, in the orthogonal direction, of the margin area is relatively long, the orthogonal misalignment of the image is less noticeable and there is less need to correct the recording position. Therefore, in this embodiment, by not executing the correction amount derivation process in such cases, the process can be simplified and thus high-speed recording can be achieved.

Before the start of one scanning operation (e.g., the (n−1)-th scanning operation) and after the start of the previous scanning operation (e.g., the n-th scanning operation) which was executed before the (n+1)-th scanning operation (S9), the CPU 10a obtains the detection result of the side edge Px of the sheet P from the sensor 5s and executes the correction amount derivation process (S10) for the scanning operation (i.e., the (n+1)-th scanning operation). By executing the correction amount derivation process for each scanning operation in this way, the orthogonal misalignment of the image can be corrected at a finer pitch in the conveyance direction, and the image quality is improved, compared to the case where the correction amount derivation process is executed for each of multiple scanning operations as described in the fifth embodiment below. In addition, by obtaining the detection result of the side edge Px from the sensor 5s immediately before one scanning operation and executing the correction amount derivation process, an accurate correction amount C can be derived. In other words, misalignment in the orthogonal direction of the image can be corrected more precisely.

In the bi-directional recording, the CPU 10a executes the correction amount derivation process in the outward movement (S8: YES: S9: S10) and does not execute the correction amount derivation process in the inward movement (S8: NO: S14). In this case, compared to the case where the correction amount derivation process is executed in both the outward and inward movements, the process is simplified and thus high-speed recording can be achieved.

The head 51 records an image on the sheet P unwound from a sheet roll R (see FIG. 1). In the case of sheet roll R, the length thereof in the conveyance direction A is generally longer than that of the cut sheet. In the case of sheet P with a longer length in the conveyance direction A, the effect of skewing becomes greater at the rear end of the sheet P. and the problem of orthogonal misalignment of the image becomes more apparent. According to the present embodiment, by executing the correction amount derivation process (S10) in such a case, the effect of suppressing the orthogonal misalignment of the image can be effectively obtained.

Second Embodiment

Figure 7A:
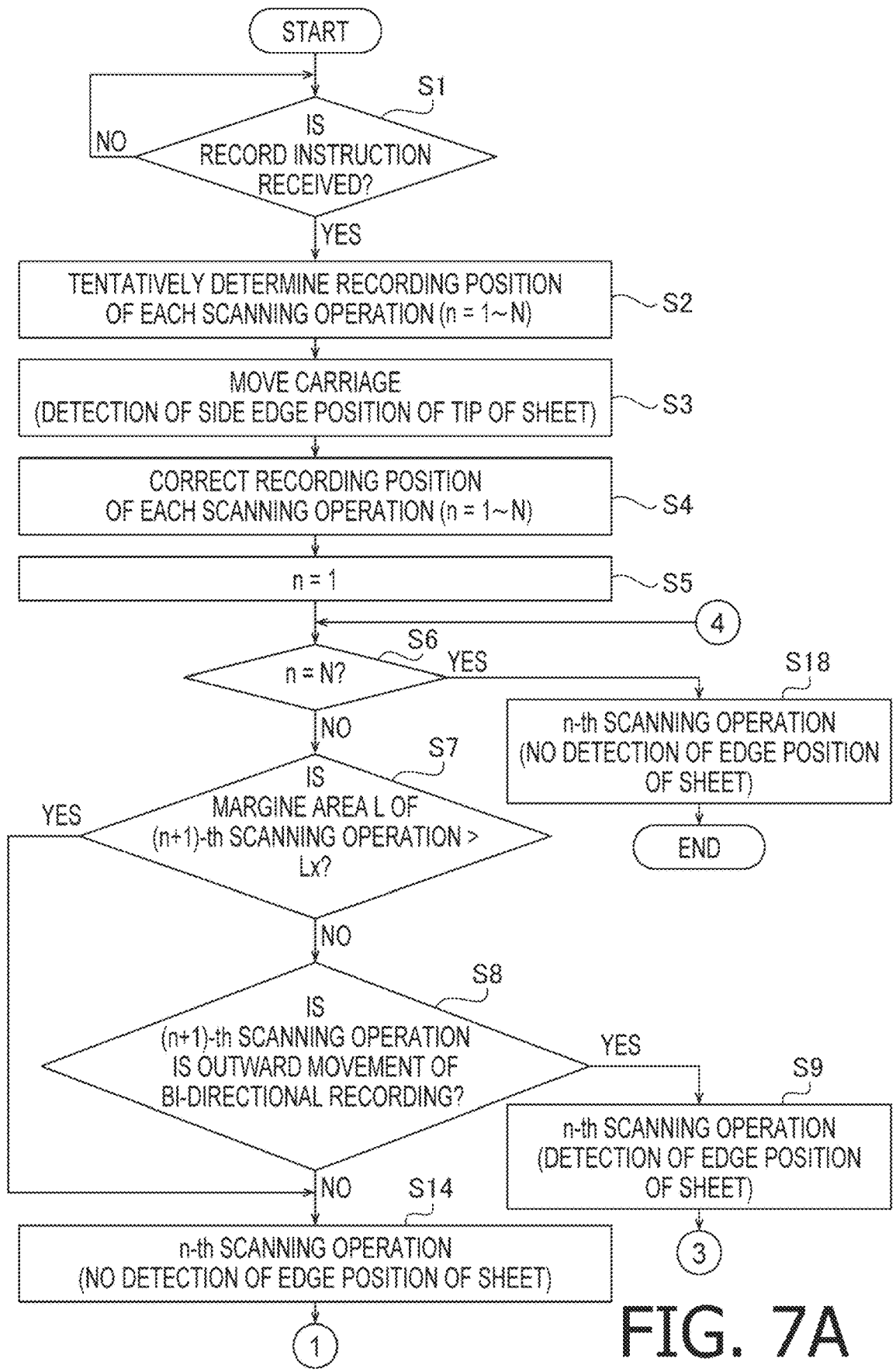
FIGS. 7A and 7B are a flowchart illustrating a program executed by the CPU of the printer according to a second embodiment.
Figure 7B:
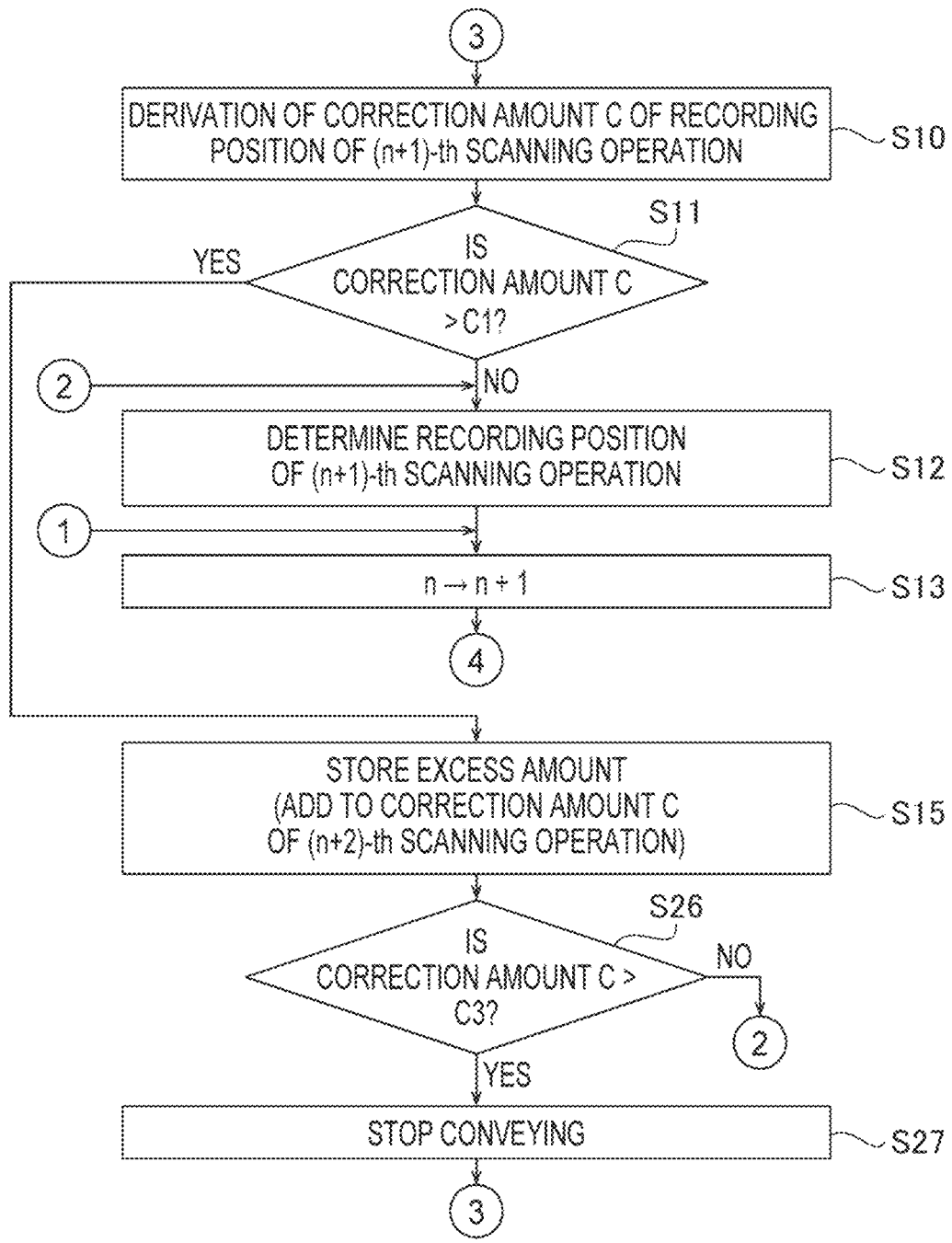

Next, referring to FIGS. 7A and 7B, a second embodiment of the present disclosures will be described.

The second embodiment differs from the first embodiment in the program executed by the CPU 10a, and is otherwise the same as the first embodiment.

In the first embodiment, after S15, the CPU 10a determines whether or not the correction amount C exceeds the second upper limit amount C2 (which is greater than the first upper limit amount C1) (S16). In contrast, in the present embodiment, after S15, the CPU 10a determines whether or not the correction amount C exceeds a third upper limit amount C2 (which is greater than the second upper limit amount C2) (S26: a third determination process).

When the correction amount C does not exceed the third upper limit amount C3 (S26: NO), the CPU 10a proceeds to S12 and determines the recording position based on the correction amount C as the recording position for the (n+1)-th scanning operation (i.e., a scanning operation for the scanning area Pn+1) (S12).

When the correction amount C exceeds the third upper limit amount C3 (S26: YES), the CPU 10a stops the conveyance of the sheet P by the conveyance mechanism 3 during the recording to the sheet P concerned and before the start of the recording to the scanning area n+1 (S27: conveyance stop process). After the execution of S27, the CPU 10a terminates the program.

When a large correction amount C that exceeds the third upper limit amount C3 is required during recording to in the scanning area n+1 of the sheet P, it is concerned that the sheet P is skewed significantly, and a jam of sheet P may occur. Therefore, in this embodiment, in such a case, the sheet P jam can be suppressed by stopping the conveyance before the start of recording for the scanning area n+1.

Third Embodiment

Figure 8A:
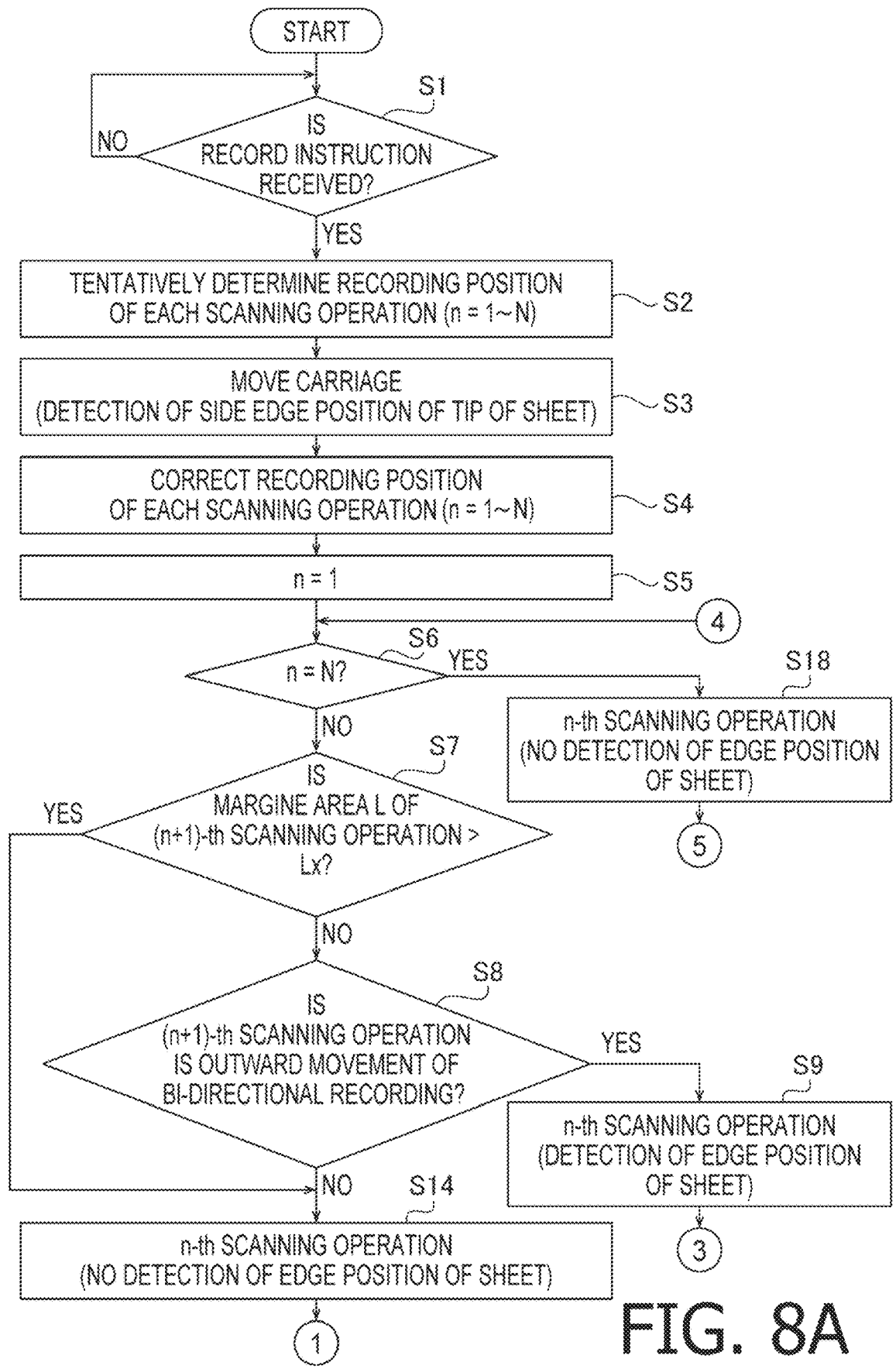
FIGS. 8A, 8B and 8C are a flowchart illustrating a program executed by the CPU of the printer according to a third embodiment.
Figure 8B:
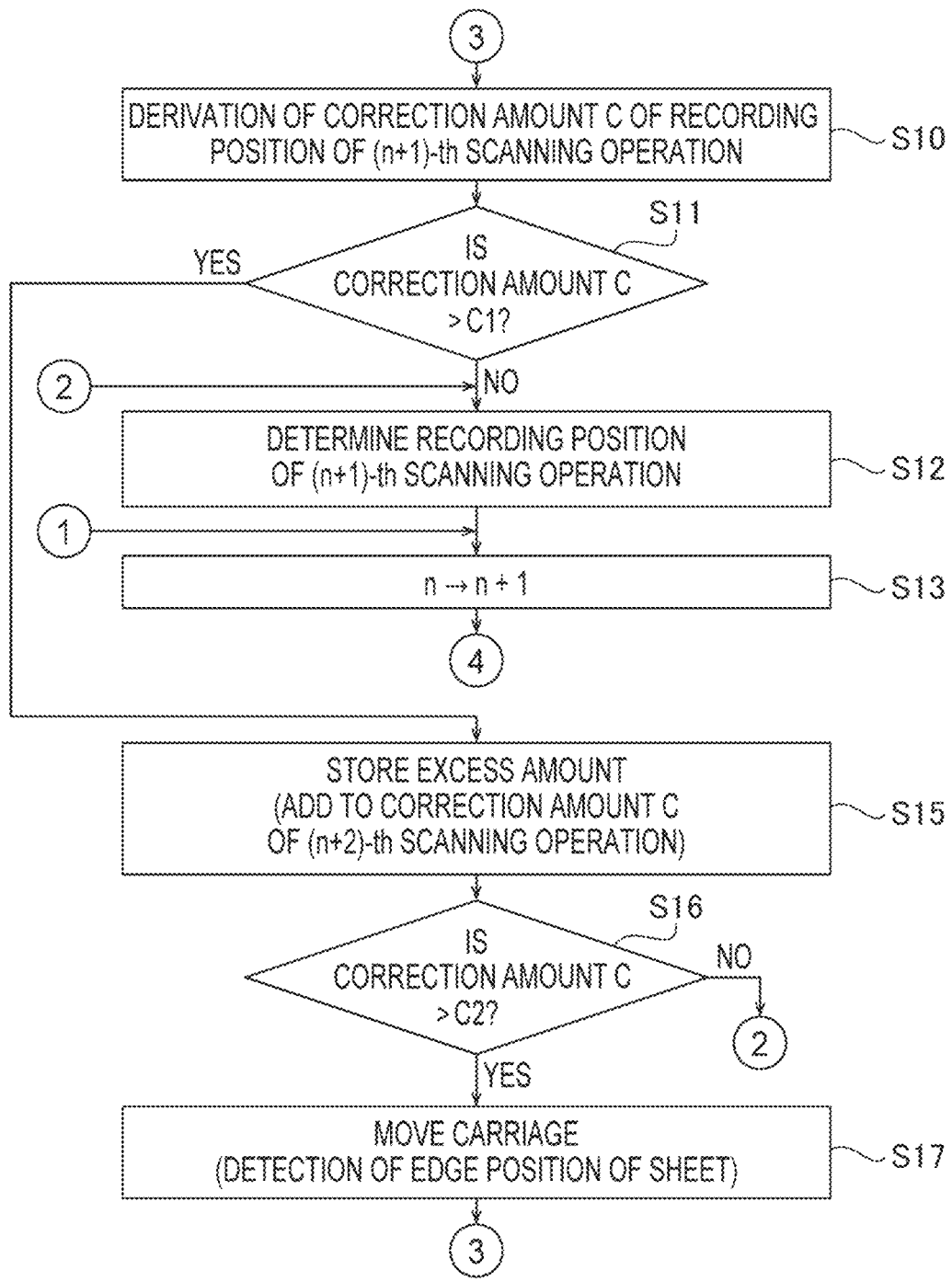
Figure 8C:
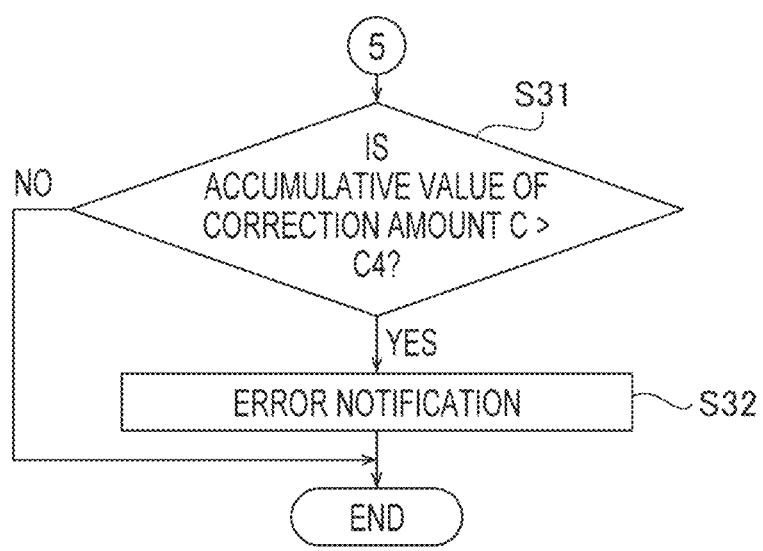

Next, referring to FIGS. 8A, 8B and 8C, a third embodiment of the present disclosures will be described.

The third embodiment differs from the first embodiment in the program executed by the CPU 10a, and the other parts are the same as the first embodiment.

In the first embodiment, after S18, the CPU 10a terminates the program. In contrast, in the present embodiment, after S18, the CPU 10a determines whether the cumulative value of the correction amount C (i.e., the cumulative value of the correction amount C of the first to N scanning operations) exceeds a fourth upper limit amount C4 (S31: fourth determination process).

When the accumulated value of the correction amount C does not exceed the fourth upper limit amount C4 (S31: NO), the CPU 10a terminates the program.

When the accumulated value of the correction amount C exceeds the fourth upper limit amount C4 (S31: YES), the CPU 10a causes the display 9 (see FIG. 3) to give an error notification (S32: a notification process) after the completion of recording for the sheet P and before the start of recording for the next sheet P. After execution of S32, the CPU 10a terminates the program.

When the accumulated value of the correction amount C is so large that it exceeds the fourth upper limit amount C4, a posture of the sheet P in the sheet feed tray 1 is considered to be a problem. Therefore, in this embodiment, in such a case, an error message is issued before the start of recording on the next sheet P, to encourage the user to reload the sheet P in the sheet feed tray 1, so that the recording on the next sheet P can be performed properly.

Fourth Embodiment

Figure 9:
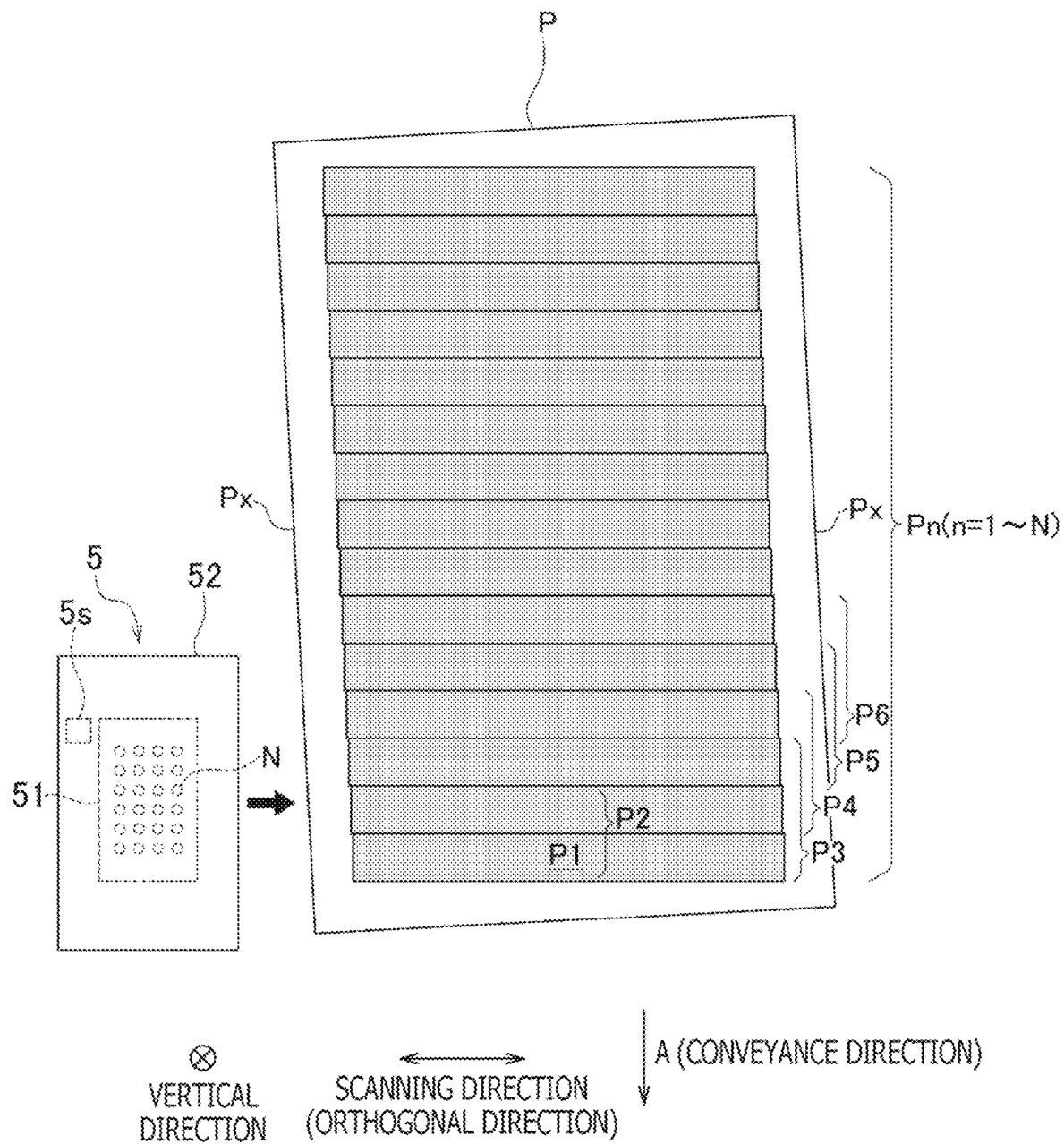
FIG. 9 schematically shows a diagram illustrating a state in which scanning areas partially overlap each other.

Next, referring to FIG. 9, a fourth embodiment according to the present disclosures will be described.

In the first embodiment (FIG. 6), the plurality of scanning areas Pn do not overlap each other, but are adjacent to each other in the conveyance direction A. In contrast, in the present embodiment (FIG. 9), the plurality of scanning areas Pn partially overlap each other. Concretely, the conveyance amount between the scanning operations in this embodiment is ⅓ of the conveyance amount between scanning operations in the first embodiment, and three scanning operations are performed for each scanning area Pn.

In the case where multiple scanning areas Pn partially overlap each other, as in this embodiment, by executing the correction amount derivation process for each scanning operation, the orthogonal misalignment of the image can be effectively suppressed.

Fifth Embodiment

Figure 10:
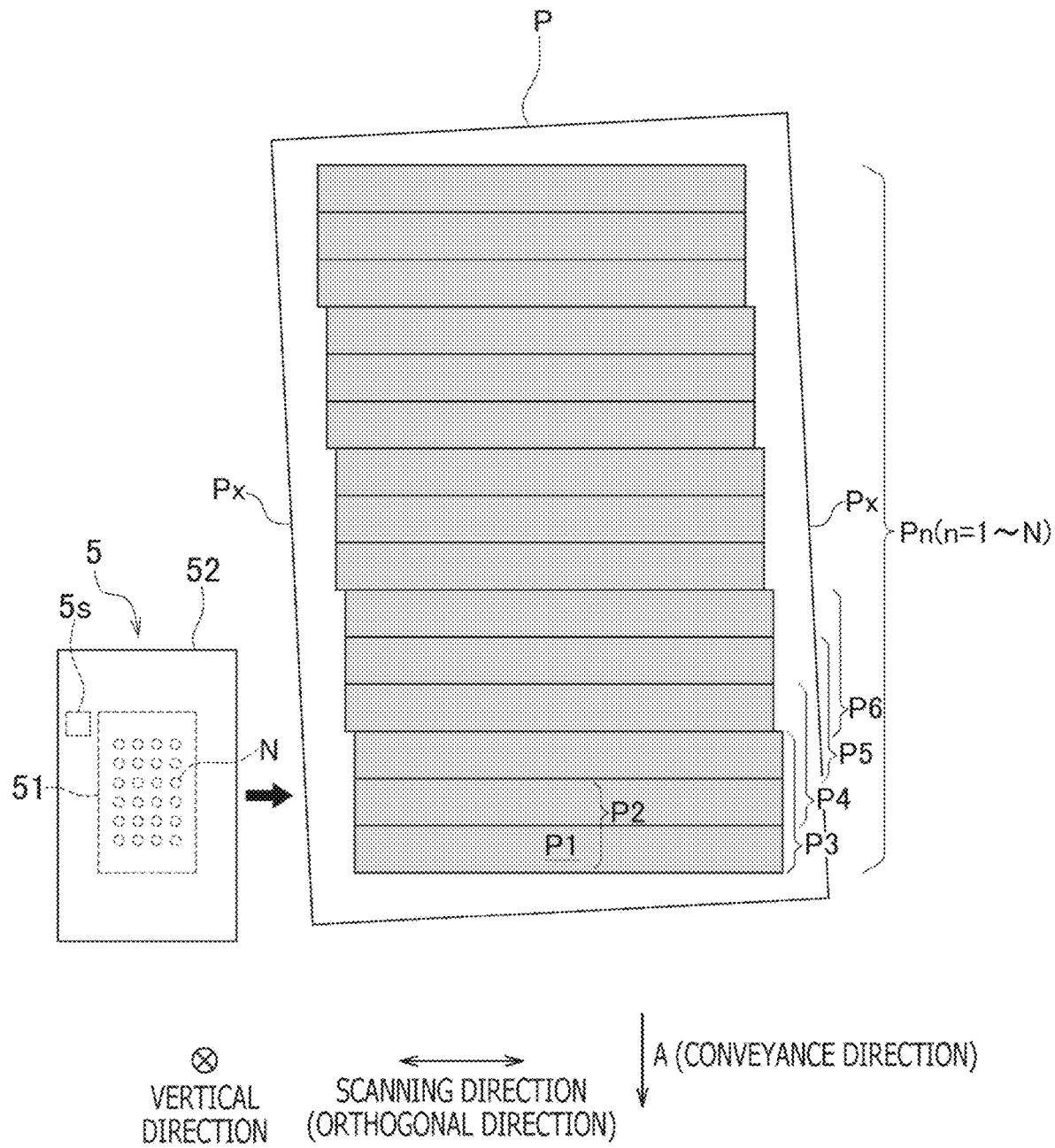
FIG. 10 schematically shows a diagram illustrating a state in which recording positions of each scanning operation is corrected based on the side edge position of the sheet for each of the plurality of scanning operations.

Next, referring to FIG. 10, a fifth embodiment of the present disclosures will be described.

In this embodiment (FIG. 10), as in the fourth embodiment (FIG. 9), the plurality of scanning areas Pn partially overlap each other. In such a case, in the fourth embodiment, the correction amount derivation process is executed for each scanning operation. In this embodiment, however, the correction amount derivation process is executed for each plurality of scanning operations (e.g., three scanning operations).

In other words, in the first through fourth embodiments, one scanning area Pn corresponds to a "unit area" according to aspects of the present disclosures, whereas in the present embodiment, three scanning areas Pn (e.g., areas corresponding to three scanning operations such as P1-P3, P4-P6 or the like) correspond to the "unit area" of the present disclosures.

According to the present embodiment, by executing the correction amount derivation process for every multiple scanning operations, the process is simplified compared to the case where the correction amount derivation process is executed for each scanning operation as in the first to fourth embodiments, and thus the high-speed recording can be achieved. In addition, by obtaining the detection result of the side edge Px from the sensor 5s immediately before the plurality of scanning operations corresponding to the unit area and by executing the correction amount derivation process, the correction amount C can be accurately derived. In other words, the misalignment, in the orthogonal direction, of the image can be corrected more precisely.

Modifications

Although the embodiments according to the present disclosures are described above, the present disclosures should not be limited to the above-mentioned embodiments, and various design changes are possible without departing from aspects of the present disclosures.

In the above-mentioned embodiment, the correction amount is derived based on the center, in the orthogonal direction, of the sheet in the correction amount derivation process (i.e., the correction amount is derived so that the center, in the orthogonal direction, of the unit area and the center, in the orthogonal direction, of the sheet coincide), but such a configuration is not necessarily limited to this. For example, the correction amount may be derived based on the orthogonal edge (e.g., a side edge) of the sheet (i.e., the correction amount may be derived so that a margin area of a particular length is provided between the orthogonal edge of the unit area and the side edge of the sheet).

There is no need to provide a margin area. In other words, the present disclosures can be applied to so-called "borderless recording."

In the above embodiment, the scanning area (unit area) adjacent to the upstream side of the conveyance direction is illustrated as the target for adding the excess amount, but the configuration is not necessarily limited to this. For example, the unit area adjacent to the downstream side of the transfer direction may be used as the target for adding the excess amount.

In the above-mentioned embodiments, the correction amount derivation process (S10) is executed based on the recording position of each scanning operation corrected in S4, but the configuration is not necessarily limited to this. For example, S3 and S4 may be omitted, and the correction amount derivation process (S10) may be performed based on the recording position tentatively determined in S2. Alternatively, the correction amount derivation process (S10) may be performed based on the recording position of the unit area adjacent to the unit area in the conveyance direction.

Before the first scanning operation, the correction amount derivation process (S3, S4) and the first decision process, and the like, may be executed.

In the third embodiment, the cumulative value of the correction amount C is illustrated as the "correction amount for multiple unit areas on one recording medium," but the correction amount is not necessarily limited to this. For example, the correction amount may be the difference between the correction amount for the first scanning operation and the correction amount for the N-th (i.e., the final) scanning operation.

In the case where the correction amount derivation process is executed for every multiple scanning operations as in the fifth embodiment (i.e., when the plurality of scanning areas Pn corresponds to the "unit area" of the present disclosures), the conveyance amount between the plurality of scanning areas Pn included in the unit area may or may not be constant.

In the bi-directional recording, the correction amount derivation process may be performed in both outward and inward movements. In addition, although the above embodiments are based on the assumption that bi-directional recording is performed, aspects of the present disclosures can also be applied to the one-directional recording.

The sensors are not necessarily limited to light-reflective sensors, but can also be light-transmissive sensors, image sensors, and the like.

The recording medium is not necessarily limited to be accommodated as a wound roll, but may be accommodated as a plurality of cut media separated from each other. The recording medium is not necessarily limited to a sheet, and may be, for example, cloth, resin material, or the like.

The head is not necessarily limited to one of the serial type, but can also be of a line type. When the head is of the line type, the recording position is defined by selecting the nozzle that ejects ink from among the plurality of nozzles contained in the head.

The head may be configured to eject a liquid other than ink (e.g., a processing liquid that coagulates or precipitates the components in the ink). The head is not necessarily limited to one employing the liquid ejection method, but may also be one employing a laser method, thermal transfer method, or the like.

Aspects of the present disclosures should not be limited to printers, but can also be applied to facsimiles, copiers, multifunction devices, and the like.

The program can be distributed by recording the same on removable recording media such as flexible disks or fixed recording media such as hard disks, or by transmitting the same via communication lines.

What is claimed is:

1. An image recording device, comprising:
a conveyance mechanism configured to convey a recording medium in a conveyance direction;
a head configured to record an image onto the recording medium;
a sensor configured to detect a position of an orthogonal edge that is an edge of the recording medium in a direction orthogonal to the conveyance direction; and
a controller, wherein the controller is configured to perform:
first deciding, for each of a plurality of unit areas aligned in the conveyance direction on the recording medium, a tentative recording position of an image recorded by the head for the unit area based on image data and a size of the recording medium;
deriving a correction amount for the tentative recording position in the orthogonal direction for each unit area based on the edge position detected by the sensor;
first determining whether the correction amount exceeds a first upper limit for each unit area;
second deciding the tentative recording position based on the correction amount as a recording position for the unit area when it is determined, in the first determining, that the correction amount does not exceed the first upper limit; and
causing the head to record an image, for each unit area, at the recording position decided in the second deciding.

2. The image recording device according to claim 1, wherein, when it is determined in the first determining that the correction amount exceeds the first upper limit, the controller is configured to add an excess amount to a correction amount for a unit area, among the plurality of unit areas, adjacent to the unit area in the conveyance direction, the excess amount being an amount of the correction amount exceeding the first upper limit.

3. The image recording device according to claim 1, wherein the controller is further configured to perform:
when it is determined, in the first determining, that the correction amount exceeds the first upper limit, second determining whether the correction amount exceeds a second upper limit which is greater than the first upper limit; and
when it is determined, in the second determining, that the correction amount exceeds the second upper limit, obtaining again a detection result of the position of the orthogonal edge for the unit area from the sensor, and deriving again the correction amount based on the detection result.

4. The image recording device according to claim 1, wherein the controller is further configured to perform:
when it is determined, in the first determining, that the correction amount exceeds the first upper limit, second determining whether the correction amount exceeds a second upper limit which is greater than the first upper limit; and
when it is determined, in the second determining, that the correction amount exceeds the second upper limit, stopping conveyance of the recording medium by the conveyance mechanism during recording on the recording medium and before starting recording on the unit area.

5. The image recording device according to claim 1, further comprising a notification device configured to issue a notification to a user,
wherein the controller is further configured to perform:
second determining whether the correction amount for the plurality of unit areas of one recording medium exceeds a second upper limit; and
wherein, when it is determined, in the second determining, that the correction amount for the plurality of unit areas of one recording medium exceeds the second upper limit, causing the notification device to issue an error notification after completing recording on the recording medium and before starting recording on a next recording medium.

6. The image recording device according to claim 1, wherein the controller is further configured to perform:
second determining whether a length, in the orthogonal direction, of a marginal area of the recording medium exceeds a particular length based on the image data;
when it is determined, in the second determining, that the length, in the orthogonal direction, of the marginal area does not exceed the particular length, perform the second deciding; and
when it is determined, in the second determining, that the length, in the orthogonal direction, of the marginal area exceeds the particular length, not perform the second deciding.

7. The image recording device according to claim 1, further comprising a moving mechanism configured to move the head in the orthogonal direction,
  wherein the controller is further configured to alternately perform a conveyance operation and a scanning operation, the conveyance operation being an operation in which the controller causes the conveyance mechanism to convey the recording medium by a particular amount in the conveyance direction, and the scanning operation being an operation in which the controller causes the moving mechanism to move the head in the orthogonal direction while causing the head to record an image,
  wherein the unit area is an area corresponding to one scanning operation, and
  wherein the controller is configured to:
    obtain a detection result of the position of the orthogonal edge from the sensor before execution of the one scanning operation and after starting a scanning operation before the one scanning operation; and
    perform the deriving a correction amount regarding the scanning operation.

8. The image recording device according to claim 7, wherein, when a bi-directional recording in which the scanning operation is performed when the head is moved both inward and outward in the orthogonal direction, the controller is configured to:
  perform the deriving when the head is moved outward; and
  not perform the deriving when the head is moved inward.

9. The image recording device according to claim 1, further comprising a moving mechanism configured to move the head in the orthogonal direction,
  wherein the controller is configured to alternately perform a conveyance operation and a scanning operation, the conveyance operation being an operation in which the controller causes the conveyance mechanism to convey the recording medium by a particular amount in the conveyance direction, and the scanning operation being an operation in which the controller causes the moving mechanism to move the head in the orthogonal direction while causing the head to record an image,
  wherein the unit area is an area corresponding to multiple scanning operations,
  wherein the controller is configured to:
    obtain a detection result of the position of the orthogonal edge from the sensor before execution of the multiple scanning operations and after starting a scanning operation before the multiple scanning operations; and
    perform the deriving a correction amount regarding the scanning operation.

10. The image recording device according to claim 1, further comprising a tray configured to accommodate a roll body having a roll-wound sheet-like recording medium,
  wherein the conveyance mechanism is configured to convey the sheet-like recording medium unwound from the roll body, and
  wherein the head is configured to record an image on the sheet-like recording medium unwound from the roll body.

11. The image recording device according to claim 1, wherein the tentative recording position is a position of the head in the orthogonal direction with respect to the conveyance mechanism.

12. A method of controlling an image recording device provided with a conveyance mechanism configured to convey a recording medium in a conveyance direction, a head configured to record an image onto the recording medium, and a sensor configured to detect a position of an orthogonal edge that is an edge of the recording medium in a direction orthogonal to the conveyance direction, the method comprising:
  first deciding, for each of a plurality of unit areas aligned in the conveyance direction on the recording medium, a tentative recording position of an image recorded by the head for the unit area based on image data and a size of the recording medium;
  deriving a correction amount for the tentative recording position in the orthogonal direction for each unit area based on the edge position detected by the sensor;
  first determining whether the correction amount exceeds a first upper limit for each unit area;
  second deciding the tentative recording position based on the correction amount as a recording position for the unit area when it is determined, in the first determining, that the correction amount does not exceed the first upper limit; and
  causing the head to record an image, for each unit area, at the recording position decided in the second deciding.

13. A non-transitory computer-readable recording medium for use with an image recording device provided with a conveyance mechanism configured to convey an image recording medium in a conveyance direction, a head configured to record an image onto the image recording medium, a sensor configured to detect a position of an orthogonal edge that is an edge of the image recording medium in a direction orthogonal to the conveyance direction, and a controller, the non-transitory computer-readable recording medium storing computer-executable instructions which cause, when executed by the controller, the image recording device to perform:
  first deciding, for each of a plurality of unit areas aligned in the conveyance direction on the image recording medium, a tentative recording position of an image recorded by the head for the unit area based on image data and a size of the image recording medium;
  deriving a correction amount for the tentative recording position in the orthogonal direction for each unit area based on the edge position detected by the sensor;
  first determining whether the correction amount exceeds a first upper limit for each unit area;
  second deciding the tentative recording position based on the correction amount as a recording position for the unit area when it is determined, in the first determining, that the correction amount does not exceed the first upper limit; and
  causing the head to record an image, for each unit area, at the recording position decided in the second deciding.

* * * * *